Patented Feb. 19, 1946

2,395,292

UNITED STATES PATENT OFFICE 2,395,292

ETHYLENE-ACETAL REACTION PRODUCT

Merlin Dewey Peterson and Arthur George Weber, Wilmington, Del., assignors to E. I. du Pont de Nemours & Company, Wilmington, Del., a corporation of Delaware No Drawing. Application January 1, 1943, Serial No. 471,058

22 Claims. (Cl. 260—338)

This invention relates to new types of products, called telomers, from ethylene and more particularly to telomers of ethylene with acetals and to the process, telomerization, for their preparation.

A number of polymers of ethylene are known, such as, for example, those described in U. S. Patent 2,153,553 and in U. S. applications 383,546; 383,553; 383,554; 383,555; and 383,556, all filed March 15, 1941. These are solid products with typically polymeric properties, such as ability to be formed into films and fibers. Other polymers of ethylene are oils, for example those polymers produced by acidic and metal halide catalysts. The oily polymers find use only in lubrication and related fields and the solid polymers have use in the plastic arts. For many applications, however, none of these polymers have the desired properties. Thus the solid ethylene polymers, even those of low molecular weight, are relatively insoluble, have poor solvent retention, and are incompatible with paraffin and other natural waxes. Furthermore, the low molecular weight polymers of this type are soft solids and the higher molecular weight products are tough, stringy, and coherent. In contrast the new ethylene-acetal telomers of this invention have a different chemical composition and show good solubility characteristics. They are compatible with paraffin and waxes over wide ranges of composition; they have high retention of solvents, especially wax solvents; they are extremely hard and form a continuous hard film without stringing or sticking, especially when laid down from a solvent gel.

An object of this invention is to produce new products from ethylene. Another object is to produce telomers of ethylene, more specifically telomers of ethylene and acetals. Yet another object is to provide a process for the preparation of telomers from ethylene and more particularly telomers from ethylene with acetals. Other objects and advantages of the invention will appear hereinafter.

The novelty of the products of this invention and of the reaction by which they are formed is such that for a clear understanding a new set of terms has been coined. The reaction has been called "telomerization" (from the Greek *telos*, meaning "end" plus the Greek *mer*, meaning "part"). Telomerization is defined as the process of reacting, under polymerization conditions, a molecule YZ, which is called a "telogen," with more than one unit of a polymerizable compound having ethylenic unsaturation, called a "taxogen," to form products called "telomers," having a new carbon to carbon bond and the formula $Y(A)_nZ$, wherein $(A)_n$ is a divalent radical formed from a plurality of taxogen molecules, the unit A being called "taxomon," $n$ being any integer greater than 1 and Y and Z being fragments of the telogen attached terminally to the chain of taxomons. Some telomerization reactions have been described in copending application Ser. No. 438,466.

Telomerization is not to be confused with interpolymerization. It is known, for example, that, under conditions similar to those described above, ethylene can be interpolymerized with a wide variety of unsaturated compounds. In such interpolymerizations a plurality of molecules of each reactant, the ethylene and the unsaturated compound, enter into the formation of every polymer chain, and the resulting product is a high molecular weight polymeric material containing recurring units of each species of reactants. In telomerization reactions, however, substantially one molecule of the telogen enters into reaction with the growing polymer chain, and the average molecular weight of the product is very much lower than that of an interpolymer or polymer formed under similar conditions. In most instances, telomerization leads to products comprised essentially of telomers of the above structure. However, depending upon the nature of the telogen and the reaction conditions, the products produced by the process of this invention sometimes appear to contain, on the average, less than one molecule of the telogen per polymer chain, but none contain more than one molecule of chemically combined telogen per molecule of the telomer. One explanation for this, which should not be construed as limiting the invention in any manner, is that the telomerization reaction is accompanied in some cases by a small amount of a side reaction which yields a relatively low molecular weight material, free of combined addenda of the telogen.

The objects of this invention have been accomplished by the discovery that ethylene can be telomerized with an acetal in the presence of a suitable telomerization catalyst. Generally speaking, the telomerization conditions include elevated temperatures, for example, from about 50° to 300° C., and the use preferably of a peroxygen-type catalyst. Telomerization catalysts are those which have been shown to yield free radicals, and to be catalysts for the polymerization of ethylene and are more fully described hereafter. The present invention differs from solution polymerization of ethylene and from polymerization of ethylene in mixed aqueous-solvent media, in that the reaction medium, the telogen reacts with the growing ethylene chains and in that the reaction is conducted in the substantial absence of water. Telomerization further differs from polymerization in that, in the presence of this telogen, a new type of product chemically combined with the telogen is produced. In the absence of the telogen, peroxygen polymerization conditions result in the formation of a polymer.

Since ethylene is normally a gas, the process of this invention requires means for compressing ethylene, pressure resistant reaction vessels and means for heating and agitating the reaction mixture. Preferably, means are also provided for deoxygenating ethylene and, for continuous operation, suitable pumps and metering devices for controlling rates of addition of various reactants. The reaction may be operated as a batch process, a semi-continuous process or a continuous process. The following discussion illustrates one manner of carrying out batchwise operation of the reaction.

A pressure-resistant reaction vessel is charged with a peroxygen catalyst and the acetal. If desired, the acetal may be diluted with an inert solvent, preferably a saturated hydrocarbon. This charging operation is preferably carried out in a nitrogen or other inert atmosphere. The vessel is closed, evacuated to remove residual air, placed in a shaker machine provided with a heater, connected to a source of high pressure ethylene and controlling and recording thermocouples placed in position. The valve to the vessel is opened and the vessel pressured with ethylene. Heating and agitation are started and, on reaching the selected reaction temperature, the reaction starts. Induction periods, often observed with polymerization reactions, are not common in telomerizations but when observed, they are generally very short. The course of the reaction may be followed by pressure drop due to the utilization of ethylene. The pressure is generally maintained in a selected range throughout the reaction by the periodic addition of fresh ethylene. The end point of the reaction is marked by cessation of pressure drop and then the vessel is cooled, bled of excess ethylene, opened and the reaction mixture discharged. The isolation of the products is easily accomplished as by methods shown in the examples or by simple modifications readily apparent to one skilled in the art.

The following examples illustrate the operation of the process of this invention and show how the products comprising the invention may be prepared. All parts are given in parts by weight unless otherwise designated.

*Example 1.*—A stainless steel lined reaction vessel is charged with 100 parts of 1,3-dioxolane and 0.2 part of benzoyl peroxide. The vessel is then closed, evacuated and placed in a shaker machine. Connection is established to a source of high pressure ethylene and recording and indicating thermocouples are placed in position. Ethylene is introduced into the vessel and heating and agitation are started. During a reaction time of 17.8 hours, throughout which the temperature is maintained at 78–100° C. and the pressure at 565–900 atmospheres, the total observed pressure drop is 140 atmospheres. After cooling, excess ethylene is bled from the reaction vessel and the mixture of ethylene/1,3-dioxolane wax and 1,3-dioxolane is discharged. The wax is freed of unreacted dioxolane by evaporation in vacuum on a steam bath. There is thus obtained 81 parts of wax which is found to have an intrinsic viscosity of 0.04, (as determined on a 0.125% solution in xylene at 85° C.), a melting point of 114–116° C. and a molecular weight (ebullioscopic) of 1130; 1110. Proximate analysis of this product found 83.69% carbon and 13.90% hydrogen from which it may be calculated that the product consists of 45.5 moles of ethylene and 1 mole of 1,3-dioxolane.

Since 1,3-dioxolane is known to polymerize in the presence of strong acids, it is conceivable that, in the foregoing reaction, interpolymerization with ethylene had been induced. The extremely small proportion of dioxolane entering into the reaction, however, is evidence against this. Further, if interpolymerization had occurred it would be most reasonable that the dioxolane units would be randomly distributed with respect to the ethylene units in the polymer chains. Hydrolysis with hydrobromic acid would split all the ether groups and yield a degraded polymer, and as a test of whether interpolymerization had occurred, this reaction is carried out. After hydrolysis with fuming hydrobromic acid at 160° C. for 16 hours, the wax is found to have the same molecular weight as the original ethylene/1,3-dioxolane wax and this is to be taken as evidence that interpolymerization does not occur but that reaction proceeds by a telomerization process. The agreement between the observed molecular weight (1120 average), and that calculated, on the assumed telomer structure, from analyses (1344) constitutes additional evidence of telomerization.

*Example 2.*—A stainless steel high pressure resistant vessel is charged with 50 parts of 1,3-dioxolane and 0.2 part of benzoyl peroxide. As in Example 1, reaction is effected by heating this mixture with 860–950 atmospheres ethylene pressure for 15 hours at 78–82° C. During this time the observed pressure drop totals 245 atmospheres. There is thus obtained 11 parts of an ethylene/dioxolane wax which has an intrinsic viscosity of 0.19 (as measured on a 0.5% solution in xylene at 85° C.) and which melts at 119–120° C.

*Example 3.*—The experiment is carried out as in Examples 1 and 2 except for the use of 200 parts of 1,3-dioxolane. There is thus obtained 22 parts of ethylene/1,3-dioxolane wax which melts at 108–110° C. and has a molecular weight (ebullioscopic) of 615.

*Example 4.*—A stainless steel pressure vessel is charged with 100 parts of methylal and 0.2 part of benzoyl peroxide. By heating this with ethylene at 75–84° C. and 750–955 atmospheres ethylene pressure for 16 hours there is an observed pressure drop totalling 575 atmospheres. This reaction yields 28 parts of ethylene/methylal wax which has an intrinsic viscosity of 0.43 (as determined on a 0.5% solution in xylene at 85° C.) and which melts at 117–119° C. This wax is analyzed and found to contain 84.06% carbon and 14.05% hydrogen from which it may be calculated that the wax contains 57 moles of ethylene and 1 mole of methylal. Methylal is not a polymerizable compound and its effect here in reacting with ethylene clearly points to a new modification of polymerization reactions, one we have chosen to name telomerization.

*Example 5.*—A mixture of 50 parts of 2-methyl-1,3-dioxolane and 0.2 part of benzoyl peroxide is charged into a stainless steel lined pressure vessel and heated at 78–85° C. under an ethylene pressure of 825–960 atmospheres for 16.75 hours. During this time the pressure drop totals 345 atmospheres. This reaction leads to the formation of 20 parts of an ethylene/2-methyl-1,3-dioxolane wax which has an intrinsic viscosity of 0.16 (as measured on a 0.5% solution in xylene at 85° C.) and which melts at 117–119° C. The observed ebullioscopic molecular weight is 1070 and the product contains 84.31% carbon and 14.16% hydrogen. This analysis corresponds to a wax containing 72 moles of ethylene and 1 mole of 2-methyl-1,3-dioxolane.

*Example 6.*—The reaction described in Example 5 is repeated except for the use of 2,2-dimethyl-1,3-dioxolane. The product of this reaction amounts to 21 parts of a wax which has an intrinsic viscosity of 0.38 (as measured on a 0.5% solution in xylene at 85° C.) and which melts at 119–120° C.

*Example 7.*—A stainless steel lined pressure resistant vessel is charged with 80 parts of methylene glycerol (the mixture of the 5 and 6 membered cyclic acetals of glycerine with formaldehyde) and 0.2 part of benzoyl peroxide. This is heated at 78–82° C. and 860–960 atmospheres ethylene pressure for 16 hours, during which time the pressure drop totals 235 atmospheres. There is thus obtained 16 parts of a wax which has an intrinsic viscosity of 0.39 (as measured on a 0.5% solution in xylene at 85° C.) and which melts at 120–122° C. Analysis of this product finds 83.46% carbon and 13.88% hydrogen and shows the product to consist of 61 moles of ethylene and 1 mole of methylene glycerol.

*Example 8.*—A mixture of 100 parts of methyl tetramethyl-d-glucoside and 0.2 part of benzoyl peroxide is heated at 78–84° C. and 855–950 atmospheres ethylene pressure for a period of 17.25 hours. During this time the pressure drop totals 525 atmospheres. The unreacted methyl tetramethyl-d-glucoside is extracted with hot alcohol and this leaves 28 parts of a wax which has an intrinsic viscosity of 0.41 (as measured on a 0.5% solution in xylene at 85° C. and which melts at 118–120° C. This product contains 83.46% carbon and 14.21% hydrogen and thus consists of an average of 138 moles of ethylene and one mole of the glucoside.

*Example 9.*—A mixture of 100 parts of 4-methyl-1,3-dioxane and 0.2 part of benzoyl peroxide is heated at 73–81° C. and 600–955 atmospheres ethylene pressure for 16.9 hours. The pressure drop observed in this time is 470 atmospheres. This reaction yields 32 parts of a wax which has an intrinsic viscosity of 0.21 (as measured on a 0.5% solution in xylene at 85° C.), a melting point of 115° C. and ebullioscopic molecular weight of 2800. Carbon and hydrogen analysis shows the product to contain 84.52% carbon and 14.00% hydrogen from which it may be calculated that the product consists of 74 moles of ethylene and 1 mole 4-methyl-1,3-dioxane.

*Example 10.*—A mixture of 100 parts of ethylal and 0.2 part of benzoyl peroxide is heated at 76–88° C. and 700–970 atmospheres ethylene pressure for 16 hours. During this time the total observed pressure drop is 1070 atmospheres. There is thus obtained 27 parts of a wax which has an intrinsic viscosity of 0.31 (as measured on a 0.5% solution in xylene at 85° C.) and a melting point of 117–119° C.

*Example 11.*—A mixture of 100 parts of the ketal of cyclohexanone and ethylene glycol and 0.2 part of benzoyl peroxide is heated at 77–96° C. and 700–950 atmospheres for 16 hours. During this time the total observed pressure drop is 705 atmospheres. There is thus obtained 35 parts of a wax which has an intrinsic viscosity of 0.24 (as measured on a 0.5% solution in xylene at 85° C.) and a melting point of 117° C.

*Example 12.*—A mixture of 100 parts of bis($\beta$-methoxy-ethyl) acetal and 0.2 part of benzoyl peroxide is heated at 74–93° C. and 780–970 atmospheres ethylene pressure for 17 hours. During this time the total observed pressure drop is 545 atmospheres. This reaction yields 42 parts of a wax which has an intrinsic viscosity of 0.24 (as measured on a 0.5% solution in xylene at 85° C.) and a melting point of 118–120° C.

*Example 13.*—The reaction of Example 12 is repeated except for the substitution of 100 parts of bis($\beta$-methoxyethyl) formal. The pressure drop totals 880 atmospheres. This yields 66 parts of wax having an intrinsic viscosity of 0.28 (as measured on a 0.5% solution in xylene at 85° C.) and a melting point of 118–120° C.

*Example 14.*—A mixture of 100 parts of 1, 3, 5-trioxane and 0.2 part benzoyl peroxide is heated at 72–100° C. and 650–975 atmospheres ethylene pressure for 15.75 hours. The total observed pressure drop is 460 atmospheres. This yields 32 parts of a wax which was soluble in organic solvents and had an intrinsic viscosity of 0.31 (as measured on a 0.5% solution in xylene at 85° C.) and a melting point of 117–119° C.

*Example 15.*—A stainless steel lined high pressure reaction vessel is charged with 95 parts of 1,3-dioxolane, 5 parts of water and 0.2 part of benzoyl peroxide. The vessel is closed, evacuated, placed in a shaker machine, pressured with ethylene and heating and agitation are started. During the reaction time of 17.75 hours throughout which the temperature is maintained at 78–84° C. and the ethylene pressure at 855–960 atmospheres, there is a total observed pressure drop of 635 atmospheres. At the end of the reaction the vessel is cooled, bled of excess ethylene, opened and the contents discharged. There is thus obtained 38 parts of the ethylene/1,3-dioxolane wax which has an intrinsic viscosity of 0.1 (as measured on a 0.5% solution in xylene at 85° C.).

*Example 16.*—A high pressure, stainless steel-lined vessel is charged with 46 parts of diethyl mucate bis-(cyclohexanone) ketal and 0.2 part of benzoyl peroxide. The vessel is closed, evacuated, placed in a shaker machine, pressured with ethylene, and heating and agitation are started. During a reaction time of 14.25 hours, throughout which the temperature is maintained at 71–90° C. and the ethylene pressure at 845–950 atmospheres, there is a total observed pressure drop of 105 atmospheres. At the end of the reaction the vessel is cooled, bled of excess ethylene, opened and the contents discharged. There is thus obtained 31 parts of ethylene wax, which melts at 118–120° C. and has an intrinsic viscosity of 0.31 (as measured on a 0.5% solution in xylene at 85° C.).

*Example 17.*—In a series of three experiments, high pressure shaker tubes are charged with 0.2 part of benzoyl peroxide and (A) 100 parts of diethyl tartrate acetal, (B) 100 parts of diethyl tartrate methyl ethyl ketal, and (C) 100 parts of diethyl tartrate benzaldehyde acetal. Reaction is effected by heating these mixtures to 80° C. and 850–900 atmospheres ethylene pressure for about 16 hrs. When worked up as usual these reaction mixtures yield 5 parts, 11 parts, and 16 parts, respectively, of waxes which have the following properties:

| Mixture | Melting point | Intrinsic viscosity |
|---|---|---|
| A | Degrees 110 | |
| B | 112–114 | 0.1 |
| C | 115–118 | |

*Example 18.*—A mixture of 100 parts ethylal and 0.3 part by volume of diethyl peroxide is heated in a stainless steel reaction vessel at 130–145° C. under 500–900 atmospheres ethylene pressure for 16.75 hours. During this time the total observed pressure drop is 605 atmospheres. This reaction mixture yields 52 parts of ethylene/ethylal wax which melts at 100–102° C. and has an intrinsic viscosity of 0.15 (as measured on a 0.5% solution in xylene at 85° C.).

*Example 19.*—A high pressure stainless steel lined reaction vessel is charged with 100 parts of 1,3-dioxolane. The vessel is closed, placed in a shaker box and pressured with ethylene. The vessel, which is not evacuated, contains approximately 300 cc. of air which produced an oxygen concentration, based on the ethylene, of about 0.05 per cent by weight. During a reaction time of 9 hours, throughout which the temperature is maintained at 172–176° C. and the ethylene pressure at 615–915 atmospheres, there is a total observed pressure drop of 460 atmospheres. This reaction mixture yields 42.5 parts of ethylene/1,3-dioxolane wax which melts at about 105° C. with prior softening at 45° C. This wax has a molecular weight of 775 (ebullioscopic) and contains 81.65 per cent carbon and 13.71 per cent hydrogen. From these analyses it may be calculated that the wax has an ethylene/1,3-dioxolane mole ratio of 22:1.

Waxes prepared under these conditions are generally in themselves soft but find use as lubricants, for example, as drawing lubricants for drawing operations in metals and as mold lubricants for vulcanization.

*Example 20.*—A stainless steel lined high pressure tube is charged with 100 parts of 1,3-dioxolane and 0.2 part of hydrazine sulfate. The vessel is closed, evacuated, placed in a shaker machine and heating and agitation are started. During a reaction time of 15.5 hours, throughout which the temperature is maintained at 223–238° C. and the ethylene pressure at 840–930 atmospheres, there is a total observed pressure drop of 130 atmospheres. The reaction mixture from this yields 42 parts of soft ethylene/1,3-dioxolane wax which has a molecular weight of 625 and which melts at 90° C. with prior softening at 40–50° C.

*Example 21.*—A stainless steel lined high pressure vessel is charged with 100 parts 1,3-dioxolane, 0.5 part of sodium persulfate and 1 part sodium tetraborate. The vessel is closed, evacuated, placed in a shaker machine, pressured with ethylene and heating and agitation are started. During a reaction time of 17.25 hours, throughout which the temperature is maintained at 79–81° C., and the ethylene pressure at 860–950 atmospheres, there is a total observed pressure drop of 225 atmospheres. This reaction mixture yields 8 parts of ethylene/1,3-dioxolane wax which melts at 116–117° C.

*Example 22.*—A stainless steel lined high pressure vessel is charged with 100 parts of 1,3-dioxolane and 0.4 part by volume of diethyl peroxide. The vessel is closed, evacuated, placed in a shaker machine, pressured with ethylene and heating and agitation are started. During a reaction time of 16 hours, throughout which the temperature is maintained at 120–130° C. and the ethylene pressure at 650–980 atmospheres, there is a total observed pressure drop of 700 atmospheres. This reaction mixture yields 81 parts of ethylene/1,3-dioxolane wax which has a molecular weight of 820 and which melts at 105–110° C. with prior softening at 40–50° C.

*Example 23.*—A high pressure stainless steel lined vessel is charged with 100 parts of 1,3-dioxolane which has been blown with air until its peroxide content was 0.18 per cent (by weight). The vessel is closed, evacuated, placed in a shaker machine, pressured with ethylene and heating and agitation started. During a reaction time of 17.5 hours, throughout which the temperature was maintained at 79–82° C. and the ethylene pressure at 805–910 atmospheres, there is a total observed pressure drop of 215 atmospheres. This reaction mixture yields 26 parts of ethylene/1,3-dioxolane wax which has an intrinsic viscosity of 0.09 (as measured on a 0.5% solution in xylene at 85° C.) and which contains 83.41 per cent carbon and 14.22 per cent hydrogen. From these analyses it may be calculated that the wax has an ethylene/1,3-dioxolane mole ratio of 46/1.

*Example 24.*—A stainless steel-lined reaction vessel is charged with 100 parts of vinyl acetate, 200 parts of 1,3-dioxolane and 0.4 part of benzoyl peroxide. The vessel is closed, evacuated, placed in a rocker mechanism and pressured with ethylene to 600 atmospheres (450 grams). Heating and agitation are started and during a reaction time of 15.5 hours, throughout which the temperature is maintained at 73–76° C. and the pressure at 695–970 atmospheres, there is a total observed pressure drop of 730 atmospheres. The vessel is cooled, bled of excess ethylene, opened and the contents discharged. This reaction mixture yields 207 parts of ethylene/vinyl acetate/1,3-dioxolane telomer which melts at 95° C., has an intrinsic viscosity of 0.20 (as measured on a ½% solution in xylene at 85° C.), and a saponification number of 55.4. The viscosity is equivalent to a molecular weight of 3590 and from this and the saponification number the telomer composition is calculated to be ethylene: vinyl acetate: 1,3-dioxolane=115:3.5:1. This is a tough wax which can be polished to a high gloss.

It has been stated that the products of this invention are telomers of ethylene with any acetal. The chief portion of the telomer is believed to have the structure

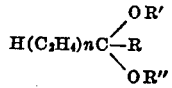

where the R is hydrogen or a saturated monovalent alkyl, aryl, aralkyl or alkaryl group and where R' and R" may be alike or different and may be saturated alkyl, aryl, aralkyl, alkaryl or R' and R" together may be an alkylene or arylene group. While the above structural formula is believed to represent best the structure of these telomers, the linkage of the acetal residue to the ethylene chain may be through an atom other than the acetal carbon as must reasonably be the case in the products of Examples 6 and 11. A comparison of the products of these examples with those of Examples 2 and 5 will show that acetals with hydrogens on the acetal carbon are rather more reactive, that is, they telomerize more readily and thereby produce products of lower average molecular weight. Acetals with no hydrogen on the acetal carbon are believed to telomerize through the removal of a hydrogen alpha to the oxygen. Whether or not the foregoing theoretical assumptions are correct does not limit the scope of the invention, inasmuch as the products and their preparations are sufficiently described for them to be readily duplicated.

This telomerization reaction is generally applicable to ethylene. Small amounts of a second polymerizable organic compound containing ethylenic unsaturation may be included to modify the properties of the telomer. For this not more than about 10 mole per cent, based on the ethylene, of a vinyl or vinylidene compound may be used. This is illustrated by Example 24.

Acetal is used in this discussion in its broadest sense and includes the chemical subgroup commonly called ketals. As is known, acetals are the methylene diethers formed by the condensation of one mol equivalent of an aldehyde or ketone with two mol equivalents of alcohol or by an indirect reaction as by reaction of a carbonyl compound with an ortho ester. A large number of specific acetals are disclosed in the examples and repetition of such a list here would be superfluous. Suffice it to say that any acetal which is free of ethylenic unsaturation can be used as a telogen in this process. Compounds of mixed function, containing an acetal and another functional group, are also operable in this invention.

The acetals used as telogens in this invention are preferably of the highest purity obtainable. Acetals, as commonly prepared, are easily purified for this reaction by distillation from sodium or from hydroquinone and distillation is preferably carried out in a nitrogen atmosphere. If these materials are to be stored for any length of time prior to reaction, it is desirable that they be stored under an atmosphere of nitrogen and in the absence of light to avoid peroxide formation. The formation of peroxide in itself does not appear to offer any particular disadvantage since, as shown by Example 23 the peroxide of the acetal itself may be used as a catalyst for the telomerization. However, the peroxides of acetals, especially of 1,3-dioxolane, undergo a further, unknown reaction and lead to the formation of products which are sometimes more or less inhibitory for telomerization reactions.

The amount of acetal to be used may vary from about 25 per cent to about 200 per cent by weight, based on the amount of ethylene reacted. Since the weight of ethylene used in this reaction is not generally accurately known, a better way of stating the concentration of the acetal is by relation of its volume to the total volume of the reaction system; on this scale from about ⅛ to ½ the volume of the reactor is conveniently filled with the acetal and the remainder of the space is taken up by gaseous ethylene. Wax-like products from such acetals as 1,3-dioxolane have, on a molar basis, a ratio of acetal to ethylene of 1 to 20, and generally 1 to 30, although the ethylene ratio may be considerably larger, e. g., from acetal: ethylene of 1:50 to 1:100 or more.

If desired, the acetal may be diluted with inert solvents. Suitable inert solvents are saturated aliphatic hydrocarbon and aromatic hydrocarbons. Specific examples of these are isooctane, normal hexane, cyclohexane, toluene, and benzene. Almost all oxygenated organic compounds show some degree of telomerization and for this reason this type of solvent is not commonly used as a diluent for acetal telomerizations. Telomerization of ethylene, however, is purely a relative reaction and in mixtures of two telogens only the more reactive will generally show up in the final telomer. Small amounts of water, say 5 to 10%, based on the acetal are permissible.

The telomer reaction between an acetal and ethylene takes place only in the presence of catalysts herein defined as telomerization catalysts. The telomerization catalysts, used in the process of this invention, are agents which are effective as catalysts for the polymerization of ethylene, and, which are at the same time, ineffective as catalysts for Friedel-Crafts reaction. It must be specifically understood that the process of the present invention is not related to the Friedel-Crafts type reactions and that the Friedel-Crafts type catalysts, such as aluminum chloride, boron trifluoride, sulfuric acid, and hydrofluoric acid, are inoperative for the present process. While the agents used in the present reaction are commonly spoken of as catalysts, it is thought that they do not act as an inert catalyzing agent such, for example, as carbon black, but that they take part in the reaction in some way. In fact, it may be that a better term for these agents would be reaction promoters. However, since reaction promoters have been called catalysts so generally in the art, and since the mechanics of the present process are not clearly established, the term "catalyst" has been employed herein.

Both polymerization of vinyl compounds and Friedel-Crafts reactions with these same type compounds are so well known that any one skilled in the art will be able, without difficulty, to select a catalyst which would be effective to promote polymerization and ineffective to promote Friedel-Crafts reaction. By way of example, the following suitable telomerization catalysts may be employed: diacyl peroxides, such as benzoyl peroxide, acetyl peroxide, benzoyl acetyl peroxide, propionyl peroxide, and lauryl pe oxide, dialkyl peroxides, such as diethyl peroxide; other peroxides, such as tetralin peroxide, cyclohexanone peroxide and the peroxide of the acetal used as a telogen; alkali metal and ammonium persulfates, perborates and percarbonates; oxygen, if used in small concentrations, say not to exceed 0.1 per cent, all of the aforesaid catalysts being herein referred to as peroxygen-type catalysts; hydrazine derivatives, such as hydrazinium salts, for example, hydrazine hydrochloride, hydrazine sulfate and dibenzoyl hydrazine; organometallic compounds, such as tetraethyl lead; ultra violet light in the presence of such photo sensitizers as benzoin, mercury, alkyl iodides and acetone. With persulfate catalysts it is generally preferable to use an alkaline inorganic compound which in an aqueous system would be considered to act as a buffer. Suitable examples are alkali metal polyborates, secondary alkali metal phosphates and alkali metal carbonates.

The temperatures employed in carrying out the process of this invention are generally in the range from 50 to 300° C. The actual temperature for any particular telomerization will depend to a large extent on the catalyst employed as well as on the thermostability of the telogen. Thus, to prepare hard waxes from ethylene and acetal, benzoyl peroxide catalysts are preferred and for this temperatures of from 50–150° C. may be considered to be a preferred range. Certain other catalysts, however, require higher temperatures for operability, for example, diethyl peroxide, oxygen and hydrazine generally require temperatures from 100–300° and here a preferred range is from 130–250° C.

Telomerization of ethylene is conveniently carried out at superatmospheric pressure, generally at ethylene pressures above 50 lbs. per sq. in. At higher pressures, however, the reaction is generally much faster. The upper limit of pressure is only that which is dictated by the strength of available equipment. In general, pressures in the preferred range from 200 to 1000 atmospheres provide a satisfactory velocity of reaction and give satisfactory yields of products.

Ethylene employed in the practice of this invention should be of the greatest purity practical. It may, however, contain small quantities of methane, ethane, propane, nitrogen, hydrogen, carbon dioxide and oxygen. The first six of these impurities generally have little or no effect on the course of the polymerization but oxygen concentration is highly critical and large concentrations of oxygen, for example, in excess of 0.1 per cent, are generally sufficient to inhibit completely the peroxide catalyzed telomerization. Quantities of oxygen less than 0.1 per cent, as previously noted, will act as a catalyst for telomerization if the reaction temperature is sufficiently high. It is generally preferable to use ethylene containing less than 0.1 per cent of oxygen.

The high pressure reactors and all portions of compression equipment, pumps, etc., which come in actual contact with the polymerization mixture or components thereof are preferably constructed of or lined with materials which will not rapidly catalyze the decomposition of peroxides to molecular oxygen. Suitable examples of such materials are stainless steels, tin, lead, aluminum, silver, enamel and glass.

Continuous operation of this telomerization reaction offers considerable advantage, especially on the semi-technical or commercial scale. By this means more rapid rates of reaction and hence higher space-time yields can be obtained and such systems generally make for greater ease of control of reaction conditions such as temperature, pressure, rate of removal of heat of reaction, and the like. Telomerization is suitably conducted in a continuous manner by pumping an acetal solution of peroxide catalyst along with ethylene through a high pressure chamber under suitable conditions of temperature and pressure or by separately pumping an acetal solution of catalyst and ethylene, mixing and passing them through a similar reaction zone or by bubbling ethylene through an acetal solution of catalyst in a continuous reaction system and simultaneously removing the product (telomerizate) and maintaining the concentration by continuous feeding of fresh solution of catalyst. Alternatively, a separate solution of catalyst in an inert solvent can be injected into the mixture of acetal and ethylene while the latter is in the polymerization zone or just before it enters the polymerizing zone. Similarly, high yields may be obtained by injecting catalyst solutions or suspensions at several points along the reaction zone. This is particularly effective since the reaction rate does not become so high at any one point that temperature control is difficult.

The ethylene acetal telomers comprising this invention have found a large number of uses. The most important of these so far uncovered has been as a substitute for carnauba and other natural waxes in polish formulas, such as automobile polish, floor polish, shoe polish, emulsion floor polish. These waxes are also suitable for use as lubricants for molding, mold lubricant for vulcanization, lubricant for drawing of metals, as a hardening agent for candles, for the manufacture of phonograph and Dictaphone records, as a modifier for lubricating oils, modifier for rubber, for paper coating and impregnation, as a flatting agent for finishes, as an antiflooding agent, as a bullet lubricant, as a moistureproof coat for "Cellophane" lacquers, for melt coating of paper, as a paper size, as a water repellent for fabrics, for textile finishes and the like.

We claim:

1. A process for the preparation of a reaction product of ethylene and an acetal which comprises reacting ethylene and an acetal, the reaction being induced by a peroxygen-type catalyst at a temperature between 50 and 300° C. and under a pressure above 50 lbs. per square inch of ethylene.

2. A process for the preparation of a reaction product of ethylene and an acetal which comprises heating under superatmospheric pressure ethylene with an acetal, the reaction being catalyzed by a peroxygen-type catalyst at a temperature between 50 and 300° C. and under a pressure above 50 lbs. per square inch of ethylene.

3. A process for the preparation of a reaction product of ethylene and a cyclic acetal which comprises reacting under heat and superatmospheric pressure ethylene and a cyclic acetal, the reaction being catalyzed by a peroxygen-type catalyst at a temperature between 50 and 300° C. and under a pressure above 50 lbs. per square inch of ethylene.

4. A process for the preparation of a reaction product of ethylene and a cyclic acetal which comprises reacting under heat and superatmospheric pressure ethylene and a cyclic acetal with at least one hydrogen on the acetal carbon, the reaction being catalyzed by a peroxygen-type catalyst at a temperature between 50 and 300° C. and under a pressure above 50 lbs. per square inch of ethylene.

5. A process for the preparation of a reaction product of ethylene and a 1,3-dioxolane which comprises heating under superatmospheric pressure ethylene with a 1,3-dioxolane, the reaction being catalyzed by a peroxygen-type catalyst at a temperature between 50 and 300° C. and under a pressure above 50 lbs. per square inch of ethylene.

6. A process for the preparation of a reaction product of ethylene and 1,3-dioxolane which comprises heating under superatmospheric pressure ethylene with 1,3-dioxolane, the reaction being catalyzed by a peroxygen-type catalyst at ar temperature between 50 and 300° C. and under a pressure above 50 lbs. per square inch of ethylene.

7. A process for the preparation of a reaction product of ethylene and an acetal which comprises effecting a reaction in accord with the equation $$YZ + n(C_2H_4) \rightarrow Y(C_2H_4)_n Z$$

in which YZ is an acetal, and $n$ is a positive integer greater than unity, by heating the reactants under ethylene pressure above 50 lbs. per square inch and accelerating the reaction under substantially anhydrous conditions with a peroxygen-type catalyst.

8. The reaction in accord with claim 7 conducted at a temperature between 50 and 250° C. and at a pressure between 50 lbs. per square inch and 1000 atmospheres.

9. The reaction in accord with claim 7 catalyzed by an organic peroxide catalyst.

10. The reaction in accord with claim 7 conducted in the presence of from 25 to 200 per cent by weight acetal based on the ethylene.

11. The reaction in accord with claim 7 conducted in the presence of from 25 to 200 per cent by weight cyclic acetal based on the ethylene.

12. A process which comprises heating a mixture of ethylene, an acetal, and a peroxygen-type catalyst to a temperature between 50 and 250° C. under pressure above 200 atmospheres.

13. A process which comprises heating a mixture of ethylene, a cyclic acetal, and a peroxygen-type catalyst to a temperature between 50 and 250° C. under pressure above 200 atmospheres.

14. A process which comprises heating a reaction mixture of ethylene, a cyclic acetal with at least one hydrogen on the acetal carbon, and a peroxygen type catalyst to a temperature between 50 and 250° C. under pressure above 200 atmospheres.

15. A process for the preparation of a saturated aliphatic hydrocarbon radical substituted by 1,3-dioxolane which comprises heating under pressure above 200 atmospheres ethylene, 1,3-dioxolane, and a peroxygen-type catalyst.

16. A process for the preparation of a saturated aliphatic hydrocarbon radical substituted by methylal which comprises heating under pressure above 200 atmospheres ethylene, methylal, and benzoyl peroxide.

17. A process for the preparation of a saturated aliphatic hydrocarbon radical substituted by 1,3-dioxolane which comprises heating under pressure above 200 atmospheres ethylene, 1,3-dioxolane, and benzoyl peroxide.

18. A process for the preparation of ethylene reaction products of an acetal which comprises heating ethylene with an acetal at a temperature between 50 and 300° C. and at an ethylene pressure above 50 lbs. per square inch in the presence of a catalyst suitable for the polymerization of ethylene but ineffective for promoting the Friedel-Crafts type reaction.

19. The product obtained in accord with the process of claim 1.

20. The product obtained in accord with the process of claim 5.

21. The product obtained in accord with the process of claim 17.

22. The product obtained in accord with the process of claim 18.

MERLIN DEWEY PETERSON.
ARTHUR G. WEBER.